United States Patent [19]

Finn et al.

[11] Patent Number: 4,502,940

[45] Date of Patent: Mar. 5, 1985

[54] METHOD FOR EXTRACTING CAKING COALS

[75] Inventors: Michael J. Finn, Cheltenham; Robert D. Hughes, Strensham, both of England

[73] Assignee: Coal Industry (Patents) Limited, London, England

[21] Appl. No.: 539,172

[22] Filed: Oct. 5, 1983

[30] Foreign Application Priority Data

Nov. 19, 1982 [GB] United Kingdom ................. 8233126

[51] Int. Cl.$^3$ .............................................. C10G 1/00
[52] U.S. Cl. .................................... 208/8 LE; 208/14
[58] Field of Search ............................... 208/8 LE, 14

[56] References Cited

U.S. PATENT DOCUMENTS

| | | | |
|---|---|---|---|
| 3,511,774 | 5/1974 | Long et al. | 208/251 |
| 4,028,220 | 6/1977 | Urquhart | 208/8 LE |
| 4,101,416 | 7/1978 | Dolbeer | 208/57 X |
| 4,330,391 | 5/1982 | Rosenthal et al. | 208/8 LE X |

FOREIGN PATENT DOCUMENTS

| | | | |
|---|---|---|---|
| 2735257 | 2/1978 | Fed. Rep. of Germany | 208/8 LE |
| 2803916 | 8/1979 | Fed. Rep. of Germany | 208/10 |
| 0484334 | 5/1938 | United Kingdom | 208/8 LE |
| 1474100 | 5/1977 | United Kingdom | 208/8 LE |
| 1525436 | 9/1978 | United Kingdom | 208/8 LE |
| 2063906A | 6/1981 | United Kingdom | 208/8 LE |

OTHER PUBLICATIONS

Supercritical Fluid Extraction Applied to Coal Liquefaction: Worthy Chemical and Engineering News, Aug. 29, 1983, pp. 18–19.

*Primary Examiner*—William G. Wright
*Attorney, Agent, or Firm*—Stevens, Davis, Miller & Mosher

[57] ABSTRACT

Caking coals can be solvent extracted in high yields without agglomeration by a first stage extraction of 380° C. to 420° C. and at a pressure above the critical pressure of the solvent, followed by a second stage at a temperature above the critical temperature of the solvent in the range 440° C. to 490° C. Conveniently, the extraction is done by a cocurrent flow, using a hydrogen donor solvent.

6 Claims, No Drawings

METHOD FOR EXTRACTING CAKING COALS

This invention concerns a method for extracting caking coals using a solvent above its critical pressure and at one stage above its critical temperature.

The extraction of coal and like materials using a solvent at temperature above its critical temperature is well known in the art, and is conveniently referred to a supercritical gas extraction to differentiate if from methods of extracting coal in a liquid solvent oil. However, known methods of supercritical gas extraction do not seem to be capable of dealing with high volatile caking coals which are of interest because it is thought that high yields of extracted material ought to be obtained. That is, studies we have made have shown that a straightforward extraction of a strongly caking coal using a number of solvents, using a residence time for the finely ground coal of 4 to 5 minutes at the temperatures 440° C. to 480° C. established as giving highest yields for other coals, have led to agglomeration of the coal, serious sticky blockages of equipment and yields of extract lower than could be expected.

British Pat. No. 1 481 695 describes and claims a method of gas extraction of coal in which two different heating rates are used, namely that the initial heating rate of the coal should be at least 20° C. per minute up to an intemediate temperature of 370° C. to 390° C. and thereafter the coal is heated to a terminal temperature at a rate of less than 20° C. per minute. Examples are given in which a coal of rank CRC 802 (The Coal Rank Code from "The Coal Classification System used by the National Coal Board", Revision of 1964), which is a high volatile strongly caking coal, is extracted. Yields of 27 to 35% are given for extract yield; these are not sufficient for economic operation at the present time. Furthermore, operation of the process on a continuous basis is difficult in achieving the specified temperature rates, and although this is more easily controlled in a batch process, any practicable large scale or even pilot plant scale plant must operate continuously.

Further studies of the supercritical gas extraction of strongly caking coals have led to a process which permits high yields of extract and without significant problems of agglomeration and equipment blockage. Accordingly, the present invention provides a continuous method for the supercritical gas extraction of strongly caking coals, comprising extracting in a first stage finely divided coal with a liquid solvent at a pressure above it critical pressure and at a temperature of 380° C. to 420° C. and for a time sufficient to extract at least a major proportion of the extractable constituents at the first stage temperature to yield an extract and a solid residue, and in a second stage extracting the solid residue with a solvent being or having a major proportion thereof in the supercritical gas phase at a temperature of 440° C. to 490° C., spearating the second stage solvent and extract from the second stage residue, and recovering the extract or combined extract from the solvent by temperature or pressure drop.

The method of the invention is conveniently carried out by a cocurrent entrained flow extraction in one or more tubular reactors adapted to give the two stages. Temperatures in the first stage are conveniently about 400°–420° C., preferably about 410° C., and in the second stage are suitably 460° to 485° C., preferably about 480° C. The temperature in either stage need not be static and may increase or decrease, although it is preferably substantially uniform. Preferably, there is rapid heating of the reaction mixture between the first stage and the second stage. The residence time of the coal in the two stages may be varied according to the temperature and also the pressure, since increasing the pressure increases the solvent density in the gas phase and improves the solvent power. In general, however, coal residence times in the first stage are suitably 1 to 5 minutes, and in the second stage are suitably 2 to 6 minutes. The pressure range is dependent upon the solvent type chosen, but is in the range 50 to 200 bar or a reduced pressure (P/Pc) of 1 to 6. In general, the higher the pressure, the better the extraction achieved, but this also results in higher capital and operating costs.

Suitable solvents have been described in the art, and are generally organic compounds having critical temperatures below, but preferably not more than about 50° C. below, the second stage temperature. Since the extract is found to be very amenable to upgrading by catalytic or non-catalytic hydrogenation and/or hydrocracking to yield chemical feedstocks and/or transport or other fuels, it will be convenient in an integrated plant to use a processderived solvent having suitable properties. Preferably, the solvent is or comprises a hydrogen donor. That is, the solvent is partially or fully hydrogenated and is capable of donating hydrogen to coalderived species under the process conditions.

The coal used is any high volatile coal which exhibits caking in the standard caking or caking index tests. Suitably, the coal should have a volatile matter content of over 30% on a dry mineral matter free basis. The coal should be finely divided, and is preferably of mean particle size less than 1.5 mm.

The solvent is suitably admixed with the coal in an amount of 5 or less parts by weight to one of coal, preferably not less than 3 parts by weight of solvent to one of coal.

It has been discovered that for a given solvent and pressure, the maximum amount of material which can be extracted from a coal increases with temperature. Thus at 400° C., a maximum yield of 32% by wt has been observed, at 440° C. a yield of 50%, at 460° C. a yield of 65% and at 480° C. a yield of 70%. However, in increasing temperature at a given pressure, the density of the solvent decreases and the solvent is less effective. It is believed, although we do not wish to be bound by any theory expressed herein, that the method of the present invention amounts to the partial extraction of the coal at the first stage temperature, reducing its volatile matter content and effectively producing a non-caking material suitable for complete extraction at the higher second stage temperature. Although the mechanism of extraction is not clear, it seems probable that normal extraction of caking coals produces extract at a rate higher than the solvent can locally accept, causing the surface accumulation of sticky tar-like material. By operating a first stage extraction at a temperature at which there is less material which it is theoretically possible to extract, the mass transfer of material into solvent is maintained at a rate at which there is little or no accumulation of material on the surface of the coal particles. Overall, therefore, the risk of agglomeration is very much reduced and there is an unexpected gain in total yield of extract.

The invention will now be illustrated by way of example only.

EXAMPLE

A tubular reactor comprising two coils of stainless steel tubing had each coil immersed in a separate fluidised sand bath, a first bath thermostatically controlled at a temperature of 410° C. and the second bath thermostatically controlled at a temperature of 480° C. A mixture was prepared of finely divided (−0.5 mm) coal from Point of Ayr Colliery in England, being a high volatile strongly caking coal of Coal Rank Code 602, with a solvent containing methyl naphthalenes, decahydronaphthalene and tetrahydronaphthalene which was intended to simulate a process-derived solvent, in a weight ratio of (4:1), solvent to coal. The mixture was passed through the tubular reactor at a liquid hourly space velocity of 8, and spent 3 minutes at 410° C. and 4½ minutes at 480° C., in each case after only a short heating period due to the efficiency of heat transfer in the sand baths. The product was passed through a separator to remove solids and then through a depressurising valve and the product extract was collected in cooled traps. The yield of extract was 68.7% by weight of the original coal (on a dry mineral matter free basis) and there was no difficulty with blockage of the reactor.

We claim:

1. A continuous method for the supercritical gas extraction of strongly caking coals, consisting of extracting in a first stage finely divided strongly caking coal with a liquid solvent at a pressure above its critical pressure and at a temperature in the range 380° C. to 420° C. and for a time sufficient to extract at least a major proportion of the extractable constituents at the first stage temperature, to yield an extract and a solid residue, and in a second stage extracting the solid residue with a solvent being or having a major proportion thereof in the supercritical gas phase at a temperature in the range 440° C. to 490° C., separating the second stage solvent and extract from the second stage residue, and recovering the extract or combined extract from the solvent by temperature or pressure drop.

2. A method as claimed in claim 1, wherein the first and second stages are carried out by cocurrent entrained flow extraction.

3. A method as claimed in claim 1, wherein the temperature in the first stage is in the range 400° C. to 420° C. and the temperature in the second stage is in the range of 460° C. to 485° C.

4. A method as claimed in claim 1, wherein coal residence times in the first stage are in the range 1 to 5 minutes and in the second stage are in the range 2 to 6 minutes.

5. A method as claimed in claim 1, wherein the pressure in both stages is in the range 50 to 200 bar.

6. A method as claimed in claim 1, wherein the solvent is or comprises a hydrogen donor.

* * * * *